US005692876A

United States Patent [19]

Cameron et al.

[11] Patent Number: 5,692,876

[45] Date of Patent: Dec. 2, 1997

[54] HYDROSTATIC TRANSMISSION FOR END DOG CARRIAGE DRIVE

[76] Inventors: Robert E. Cameron, deceased, late of Warrenton, Oreg.; Carol A. Rodrequez, executrix, P.O. Box 251, Warrenton, Oreg. 97146; Jack D. Dennon, 118 SW. First St., Warrenton, Oreg. 97146

[21] Appl. No.: 576,445

[22] Filed: Dec. 21, 1995

[51] Int. Cl.[6] .................... B65G 35/00

[52] U.S. Cl. .................... 414/751; 212/330; 198/621.1; 144/242.1; 91/534; 414/746.8; 294/119.1; 294/88

[58] Field of Search .................... 414/749, 751, 414/746.8; 144/242.1, 245.1; 212/316, 330, 901; 294/119.1; 91/88, 525, 534; 198/621.1; 83/435.11, 435.17, 435.18, 435.22, 435.23

[56] References Cited

U.S. PATENT DOCUMENTS

| | | | |
|---|---|---|---|
| 3,727,772 | 4/1973 | Pauls | 414/746.8 |
| 5,011,001 | 4/1991 | Cameron | 83/435.11 X |

*Primary Examiner*—Donald W. Underwood
*Attorney, Agent, or Firm*—Delbert J. Barnard

[57] ABSTRACT

A log carriage system including a pair of carriages (10, 12) mounted for linear movement along a conveyor track. A pair of linear hydraulic motors (32, 44) each include a piston rod (30, 42) for both clamping and linear transfer of a log. A reversible hydraulic pump (62) transfers oil between working chambers (40, 52) of motors (32, 44) to move the log along a linear path past a cutting station. A three-way, two-position valve (120) connects line (68) to tank (T), and disconnects line (70) from system pump (SP), when pump (62) is operated to move oil from motor (32) to motor (44). Alternatively, linear hydraulic motors (32, 44) can be replaced by rotary hydraulic motors and a cable drive system for both clamping the log and moving the log along the linear path.

12 Claims, 5 Drawing Sheets

HYDROSTATIC TRANSMISSION FOR END DOG CARRIAGE DRIVE

TECHNICAL FIELD

This invention relates to end-dogging systems for delivering logs to a cutting station to be cut into various lumber segments. More particularly, it relates to a hydrostatic transmission for an end dog carriage drive enabling two carriage sections to operate independently to dog logs.

BACKGROUND OF THE INVENTION

An end-dogging log carriage system comprises a carriage having spaced-apart elements termed "end dogs" between which a log is secured. The dogs are movable between "raised" and "down" positions. The carriage is brought to a pick-up station with the end dogs raised. Logs are delivered sideways, one at a time, to the pick-up station. The end dogs are then swung downwardly against the two ends of the log. The end dogs include teeth that bite into the ends of the log, to secure the log to the carriage. The carriage is then moved along a track to move the log endwise through a cutting station. The cutting station may include one or more bandsaws, circular saws, or chipper heads, etc.

Prior art end-dogging log carriages have typically included the log-clamping mechanism as part of the carriage itself. The log-clamping equipment, i.e. cylinders, motors, winches, brakes, etc., add considerable mass to the carriage. Ideally, the carriage should have as little mass as possible, so that it can be returned from the cutting station to the pick-up station as quickly as possible.

There is a need for a log delivery mechanism that is lightweight so that it can be moved quickly, and which has few components for low-cost manufacture. Such a system should utilize as many off-the-shelf components as possible, again, to lower costs. There is also a need for a carriage drive mechanism that has the foregoing features and which is especially adapted to process second growth timber or small size logs. The present invention is directed to provide such a mechanism.

SUMMARY OF THE INVENTION

Briefly described, the present invention comprises a log carriage system having a first and second log carriage section, both mounted for travel back and forth along a linear path, and adapted to receive and clamp a log between their respective dog arms. A first reversible hydraulic motor is coupled to the first carriage section. The first reversible hydraulic motor has first and second ports corresponding to the respective working chambers of the motor and which provide for hydraulic connection to the control system. A second reversible hydraulic motor is coupled to the second carriage section, and it has third and fourth ports, as well. A reversible hydraulic pump is provided to move the first and second carriages in unison along a linear path. The reversible hydraulic pump has fifth and sixth ports. A first conduit interconnects the second and fifth ports, and a second conduit interconnects the third and sixth ports. The first and second conduits and the reversible hydraulic pump together define a first part of a closed loop between the first and second reversible hydraulic motors. A third conduit connects the first and fourth ports of the reversible hydraulic motors and forms a second part that completes the series loop through the motors and the pump. The pump is operable in a first direction, to pump hydraulic fluid from the first motor to the second motor, to power the motors for moving the carriage sections together in a first direction, along the linear path. The pump is operable in a second reverse direction, to pump hydraulic fluid from the second motor to the first motor, to power the motors for moving the carriage sections together in a second opposite direction along the linear path.

Preferably, a four-way switching valve is connected to switch hydraulic fluid pressure and return between the first and second portions of the loop, for moving the carriage sections together and apart.

In one embodiment, the first and second reversible hydraulic motors comprise linear hydraulic motors. Each linear motor has a cylinder component and a piston component, with each log carriage section connected to a piston component. When fluid pressure, applied via the four-way switching valve, moves the two carriage sections inward, toward each other, and thereby clamps a log between them, the reversible hydraulic pump does not see the high pressure in the working chambers of the linear hydraulic motors. Once the log is dogged, the high pressure at the working chambers is cancelled by the clamping load created on the log itself.

In an alternative embodiment, the first and second reversible hydraulic motors comprise rotary hydraulic motors. In this embodiment, a cable and sheave drive mechanism is provided for moving the first and second log carriage sections along the linear path. The rotary hydraulic motors rotate an endless cable to move their respective carriages' section along the linear path.

In both embodiments, the log-clamping equipment has been removed from the carriage. This allows the carriages to be extremely lightweight. A lightweight carriage can be moved more quickly by any given hydraulic system, which leads to higher productivity for the machine.

Preferably, both embodiments include a three-way, two-position switching valve for connecting the first conduit to return when the hydraulic pump pumps hydraulic fluid from the first motor to the second motor. The three-way, two-position switching valve also disconnects the high pressure side of the hydraulic pump from return when the pump operates to accelerate the carriages in the reverse direction. In this manner, the high pressures created by the hydraulic pump are contained, and cavitation in the pump is prevented.

With this design, the clamping mechanism has been integrated into the feed works or reciprocating drive mechanism in such a manner that no clamping equipment rides on the carriages. By combining the feed works and clamping arrangement with the method of spring-loading a carriage against a side rail, as described in U.S. Pat. No. 4,697,487, a lightweight carriage is achieved that expedites throughput with no sacrifice of transport linearity.

These and other advantages, features, and objects of the present invention will become apparent from the following disclosure of the best mode when read in conjunction with the drawings and the claims, which are all incorporated herein by reference.

BRIEF DESCRIPTION OF THE DRAWINGS

Like reference numerals, letters and legends are used to designate like parts and things throughout the several views of the drawing, and.

BEST MODE FOR CARRYING OUT THE INVENTION

Figure 1:
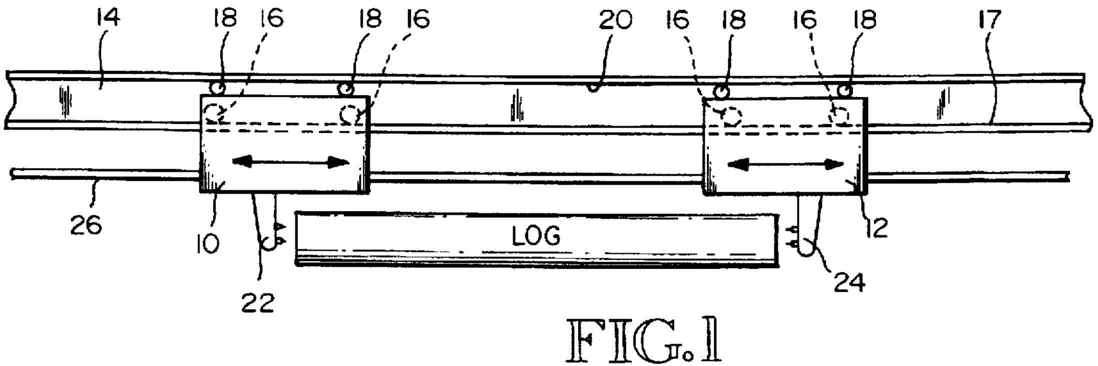
FIG. 1 is a side elevational view of a log carriage system, composed of a pair of carriage sections, such view showing the carriage sections spaced outwardly from a log that is located between them, such view including arrows associated with the carriage sections which indicate that the carriage sections are independently movable towards and away from each other.
Figure 2:
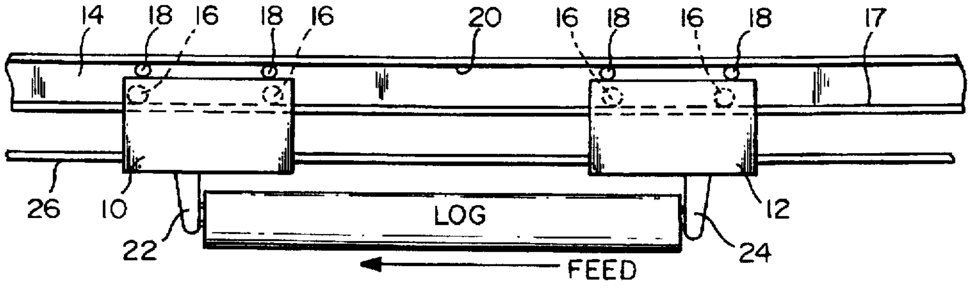
FIG. 2 is a view like FIG. 1, but showing a log clamped by and between the two carriage sections, and showing the two carriage sections and the log moving together in a direction labeled "feed;"
Figure 3:
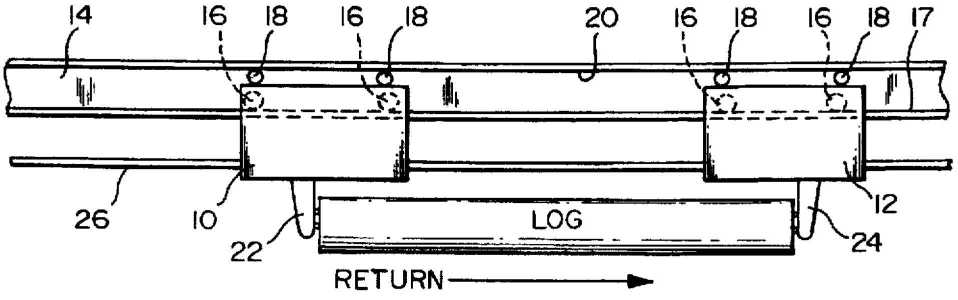
FIG. 3 is a view like FIG. 2, but showing the log and the two carriage sections moving together in the opposite direction, labeled "return;"

Referring to FIGS. 1–3, a pair of carriage sections 10, 12 are shown supported on, and guided along, an elevated track 14. The carriage sections are shown to include wheels 16 which ride on lower rails 17 of the track 14 and stabilizing rollers 18 which ride on upper rails 20 of the track 14. The system includes a side rail 26 that is contacted by rollers (not shown) on the carriage sections 10, 12. Side rail 26 keeps carriages 10, 12 aligned along a linear path of the log carriage system. The carriage sections 10, 12 include log engaging elements termed "dogs" which may be retractable and are designated 22, 24.

Carriage sections 10, 12 are movable together, into clamping engagement with the log, and are movable apart, for releasing the log. As shown by FIGS. 2 and 3, the carriage sections 10, 12 and the log are movable together in a "feed" direction and a "return" direction along the linear path defined by the track 14. The construction of the carriage sections 10, 12, the dogs 22, 24, the retraction mechanism for the dogs 22, 24, the track 14, the wheels 16 and rollers 18, and the side rail 26, are not a part of the present invention. Exemplary embodiments of these components are disclosed in U.S. Pat. No. 4,697,487, granted Oct. 6, 1987, to Robert E. Cameron, and in U.S. Pat. No. 5,011,001, granted Apr. 30, 1991, to Robert E. Cameron. To the extent necessary, the contents of these patents are hereby incorporated herein by this specific reference. The present invention can also be combined with the carriage and track design of my companion patent application, Ser. No. 08/620,491, entitled, "End Dog Carriage Twin," filed Mar. 22, 1996.

Figure 4:
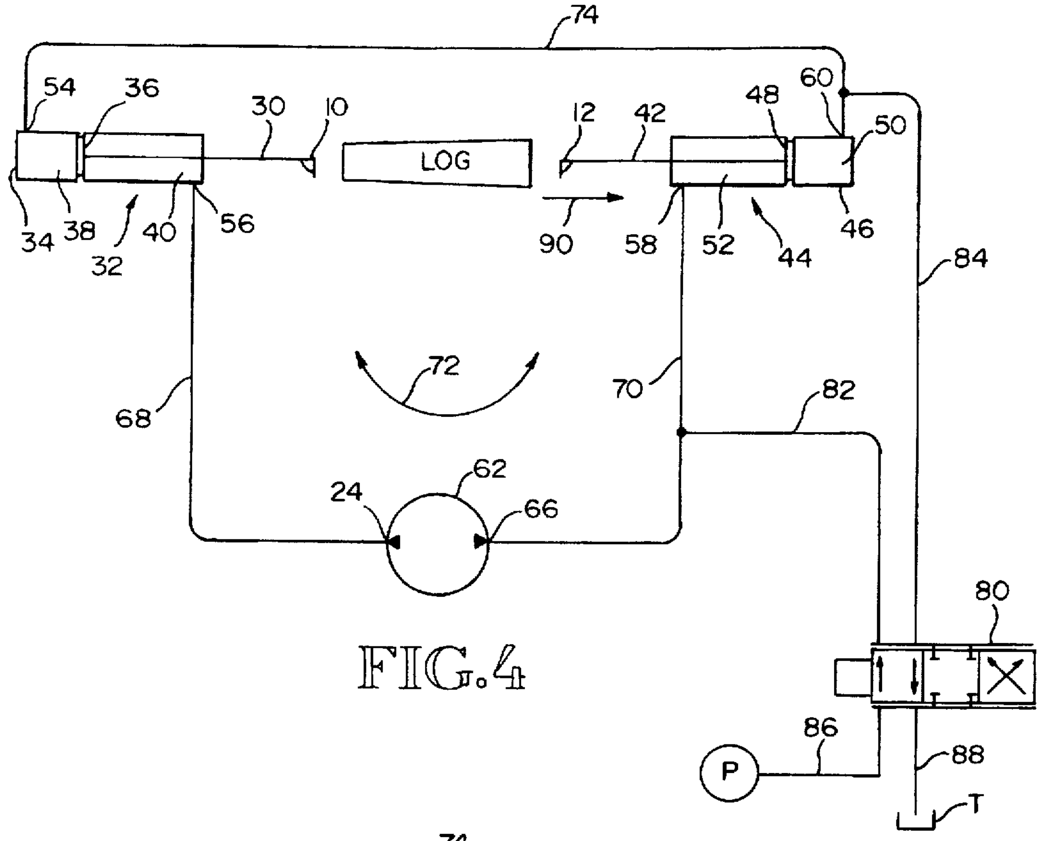
FIG. 4 is a schematic basic system diagram, showing a four-way switching valve positioned to move the piston components of a pair of linear hydraulic motors, out of clamping contact with the ends of a log that is located between them.
Figure 5:
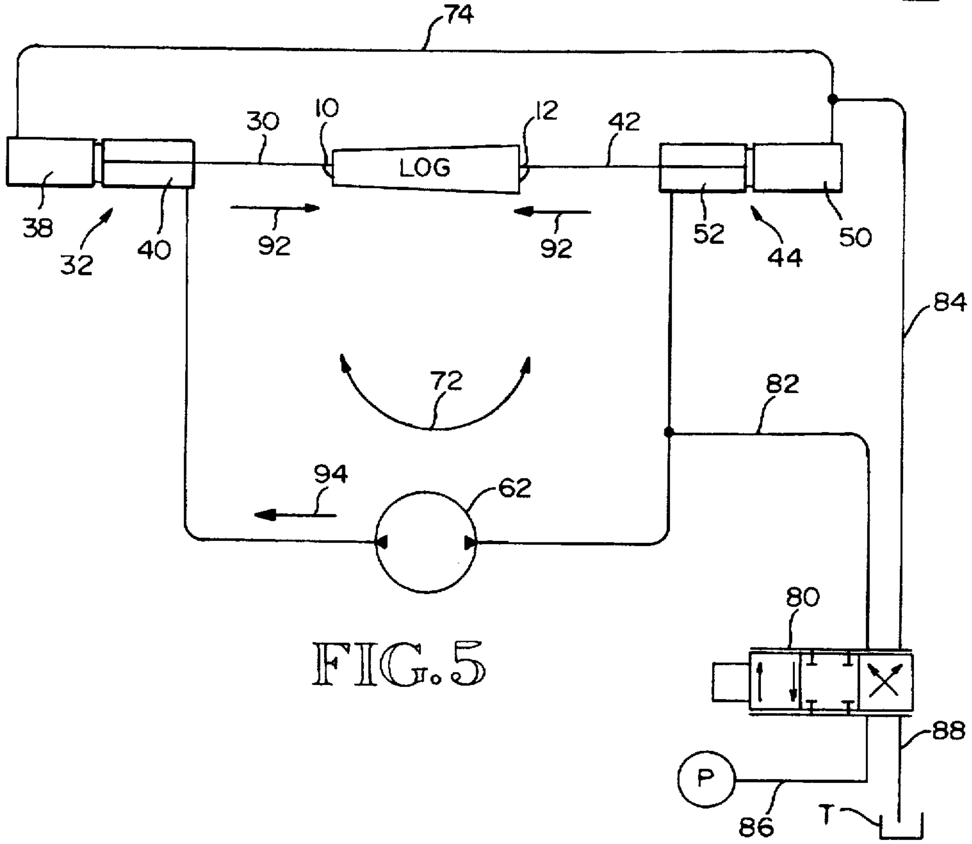
FIG. 5 is a view like FIG. 4, but with the switching valve switched in position, for delivering hydraulic fluid to the linear hydraulic motors, for moving the piston components of the motors into clamping contact with the ends of the log.

In FIGS. 4 and 5, a basic schematic system diagram for moving carriages 10, 12 is shown. Carriages 10, 12 are represented schematically by the "dogs" themselves. Carriage 10 is connected to the distal end of a piston rod 30 of a linear hydraulic motor 32. Motor 32 also includes a cylinder component 34 and a piston head 36. Piston head 36 and cylinder component 34 define first and second working chambers 38, 40, respectively. Likewise, carriage 12 is connected to the distal end of piston rod 42 of a second linear hydraulic motor 44. Motor 44 includes a cylinder component 46 and a piston head 48, defining first and second working chambers 50, 52, respectively. Linear hydraulic motor 32 includes first port 54 and second port 56. Linear hydraulic motor 44 includes third port 58 and a fourth port 60.

A reversible hydraulic pump 62 includes a fifth port 64 and a sixth port 66. A first line or conduit 68 connects port 56 of motor 32 with port 64 of pump 62. A second conduit 70 connects port 58 of motor 44 with port 66 of pump 62. First conduit 68, second conduit 70 and hydraulic pump 62 together define a first loop, as indicated by arrow 72, between working chambers 40, 52 of hydraulic motors 32, 44. A third conduit 74 connects port 54 of motor 32 with port 60 of motor 44. Conduit 74 forms a second loop between working chambers 38, 50 of motors 32, 44.

A four-way, two-position valve 80 is movable between a first, "unclamp" position, as shown in FIG. 4, and a second, "clamp" position, as shown in FIG. 5. Conduits 82, 84 connect switching valve 80 with first loop 72 and second loop 74, respectively. Conduit 86 connects switching valve 80 to a system pump P, and conduit 88 connects switching valve 80 to a system tank T.

In operation, to move carriage sections 10 and 12 apart from one another, in order to unclamp a log or position a log between the carriages, switching valve 80 is moved to its first position, as shown in FIG. 4. System pressure from pump P moves through line 82 and into loop 72 where it enters the second working chamber 52 of motor 44. First working chambers 38, 50 of motors 32, 44 are connected to line 74 and line 84, which lead to tank T. Piston rod 42 retracts into cylinder 44, moving carriage 12 away from carriage 10, as indicated by arrow 90. Only pump 62 can move oil from line 68 to line 70. When valve 80 opens the dog space, only carriage 12 is moved. Of course, pump 62 may be moving both carriages in reverse at the same time as the dog space is being adjusted, either opened or closed.

To clamp or dog the log, switching valve 80 is moved to its second position, as shown in FIG. 5. Pressure is switched to line 84 and moves into loop 74 and into the first working chambers 38, 50 of motors 32, 44. The second working chambers 40, 52 are connected to tank via loop 72 and line 82. Piston rods 30, 42 extend from their respective cylinder components, which causes carriages 10, 12, and particularly their respective dogs, to clamp the log, as indicated by arrows 92.

With the log dogged by carriages 10, 12, hydraulic pump 62 is operated to transfer hydraulic fluid from second working chamber 52 of motor 44 into second working chamber 40 of motor 32, in the direction indicated by arrow 94. This causes piston rod 30 and piston rod 42, as well as carriages 10, 12 and the log, to move in unison in the "feed" direction, as illustrated in FIG. 2. Reversal of hydraulic pump 62 moves hydraulic fluid from working chamber 40 into working chamber 52, moving the log in the "return" direction, illustrated in FIG. 3. An advantage of this tandem linear motor connection to the hydraulic pump is that the pump does not see the high pressure of lines 74, 84. The high pressure at working chambers 38, 50 is cancelled by the clamping load created on the log itself.

The length of potential travel of the log is dictated by cylinder components 34, 46. For some operations, it is feasible that the cylinder components could be several yards long. However, the disclosed linear hydraulic motor system has been found to work best for logs of short length, thus limiting the length of the cylinders.

Figure 6:
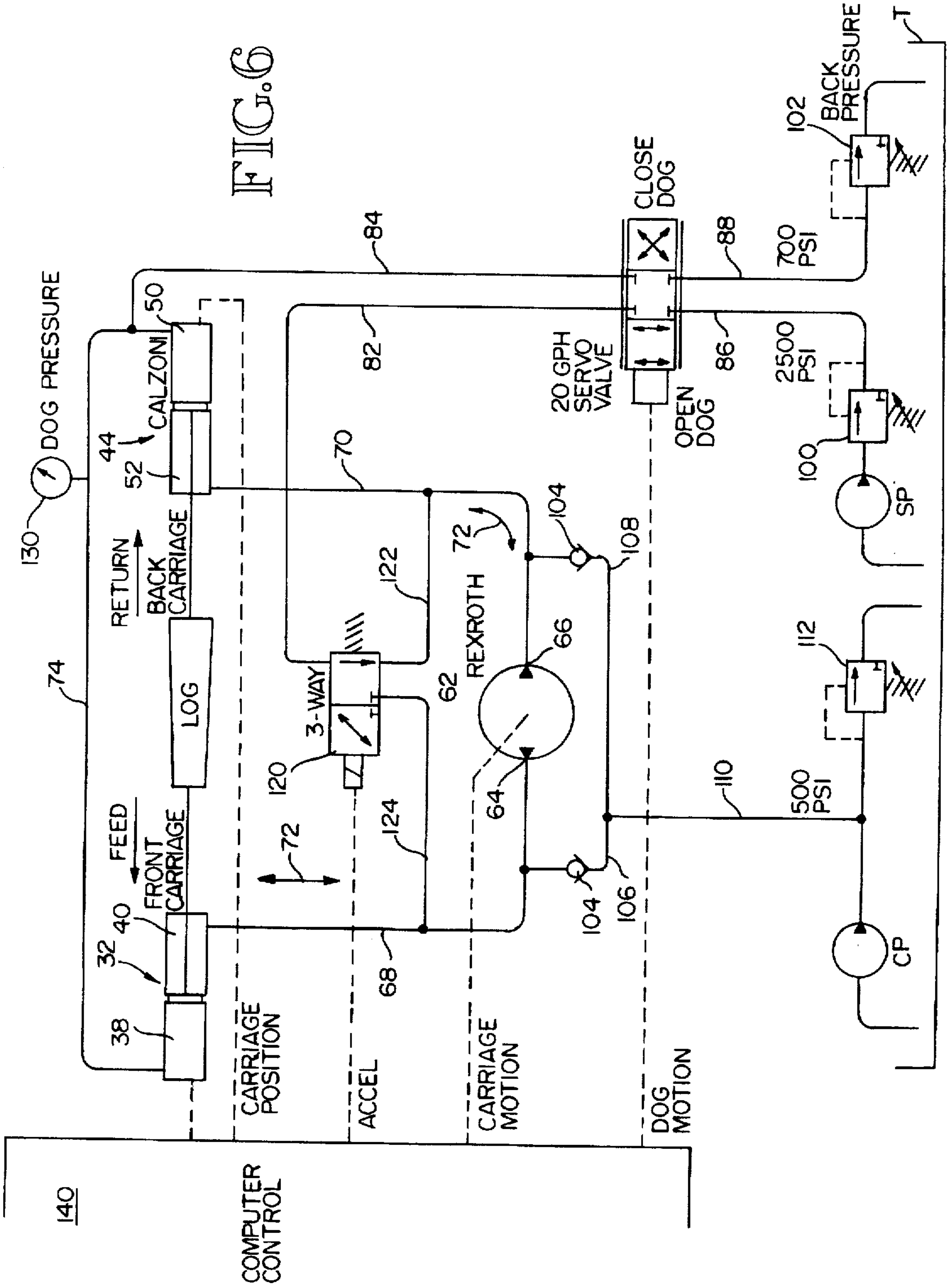
FIG. 6 is a more detailed system diagram of the system shown by FIGS. 4 and 5.

Referring to FIG. 6, the system of FIGS. 4 and 5 is shown in greater detail with additional components illustrated. The system pump P of FIGS. 4 and 5 has been redesignated SP. A pressure relief valve 100 is provided in line 86 should the pressure in line 86 exceed a preset maximum. A back pressure relief valve 102 is provided in line 88 to maintain a preset minimum pressure in line 88. A pair of check valves 104 are provided in a pair of system charge lines 106, 108, which join to form a common charge line 110. A charge pump CP replenishes lost hydraulic fluid in loop 72, and a change pressure regulating pressure relief valve 112 is provided between line 110 and tank T.

A three-way, two-position valve 120 is provided to prevent cavitation in hydraulic pump 62. In its first position, as illustrated, valve 120 connects line 82 to line 122, which leads to line 70. In its second position, valve 120 connects line 82 with line 124, which leads to line 68. When the log carriage system is accelerated in the "return" direction, typically, the log is being repositioned for a subsequent cut and, thus, needs to be moved quickly to the new position. This requires hydraulic pump 62 to move hydraulic fluid from working chamber 40 of motor 32 into working chamber 52 of motor 44. Three-way valve 120 functions to connect line 68 to tank when hydraulic pump 62 is operated in this manner. This prevents the high pressure at 70, due to reverse acceleration, from forcing oil out of the main loop 72 via valve 80 and through line 88 and valve 102, to tank. During reverse acceleration, the pressure at 68 is about the same as the pressure at 88, so no oil is lost through valve 80 even though valve 80 is in the "close" dog position. This also assures sufficient hydraulic fluid at port 64 to prevent cavitation. Three-way valve 120 functions to switch the tank side of switching valve 80 away from the high pressure of line 70 created by accelerating the carriages in a reverse direction. In addition, three-way valve 120 provides periodic charge pressure regulation to one side of loop 72.

A dog pressure gauge 130 is provided in loop 74 to monitor the clamping pressure in first working chambers 38, 50.

A microprocessor controller 140 controls operation of switching valve 80, hydraulic pump 62, and three-way valve 120. Microprocessor controller 140 can be any conventional controller capable of monitoring and controlling operation of hydraulic components. A computer program for operating controller 140 is appended to this application in micro fiche form.

Hydraulic pump 62, in a preferred embodiment, is manufactured by Rexroth Corporation of Bethlehem, Pa., U.S.A., Model No. AA4VSG250 HS/22R PKD 6OL 6O OF. The valve block normally provided with this hydraulic pump is removed. That valve block contains cross relief valves and the "shuttle" or "hot oil" valve, which dumps the low side of the main loop 72 to tank T and thereby circulates new cooled oil into the loop 72. The control system of FIG. 6 does not work satisfactorily with such a shuttle valve. By removing the valve block, the factory-standard cross relief valves and the charge pressure regulator are eliminated. An external regulator valve 112 provides charge pressure regulation, and external cross relief valves (not shown) are placed across pump 62 for load limiting.

Preferably, system pressure is maintained around approximately 2,500 psi and back pressure from tank T is maintained at 700 psi. Charge pressure from pump CP is maintained at 500 psi, above which check valves 104 open to resupply hydraulic fluid to main loop 72.

Figure 7:
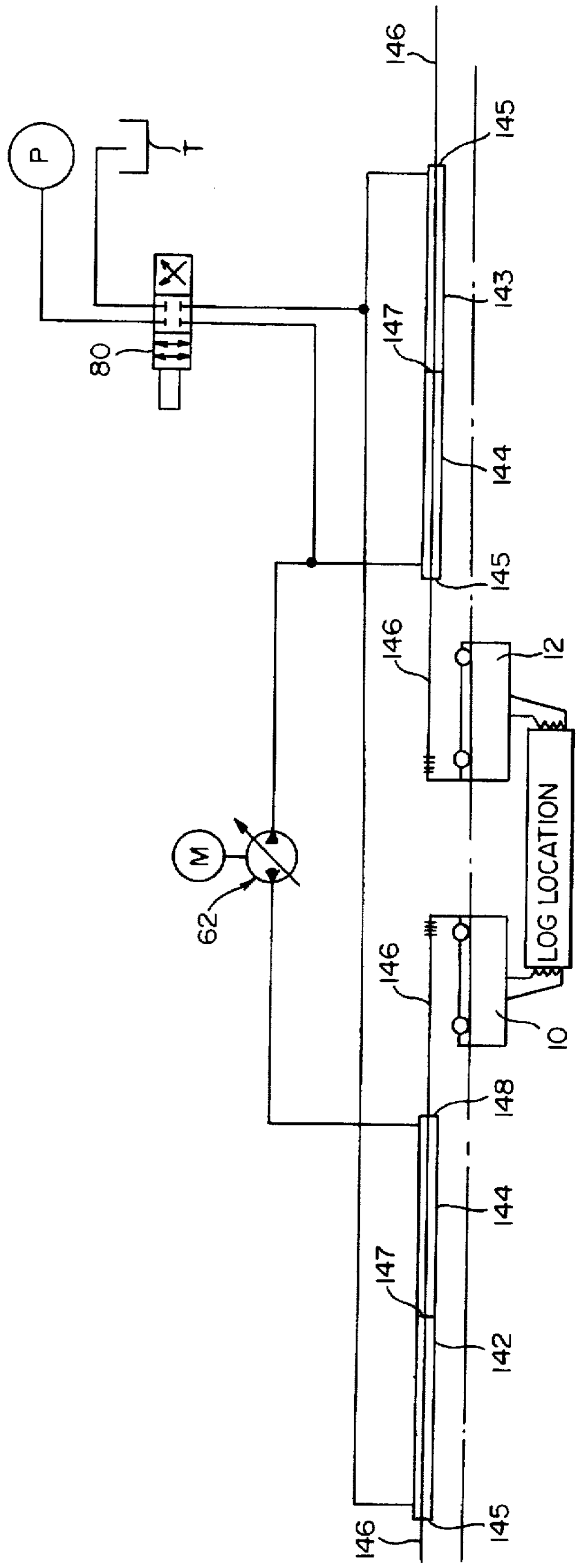
FIG. 7 is a view of a modified system, such system being characterized by balanced linear hydraulic motors, and such view including a schematic showing of a pair of carriage sections.

In FIG. 7, an alternate embodiment is illustrated wherein balanced linear hydraulic motors 142, 143 replace the motors of FIGS. 4–6. Each linear motor 142, 143 includes a cylinder component 144 having end walls 145. The piston components include a piston rod 146 and a piston head 147. Piston rod 146 extends through both cylinder end walls 145. The inner ends of piston rods 146 are coupled to carriages 10, 12. The hydraulic control system is similar to that of the systems described in FIGS. 5–6. Balanced linear hydraulic motors 142, 143 are known to provide improved system integrity in that the seals between piston head 147 and the working chambers of cylinder components 144 better maintain system integrity.

Figure 8:
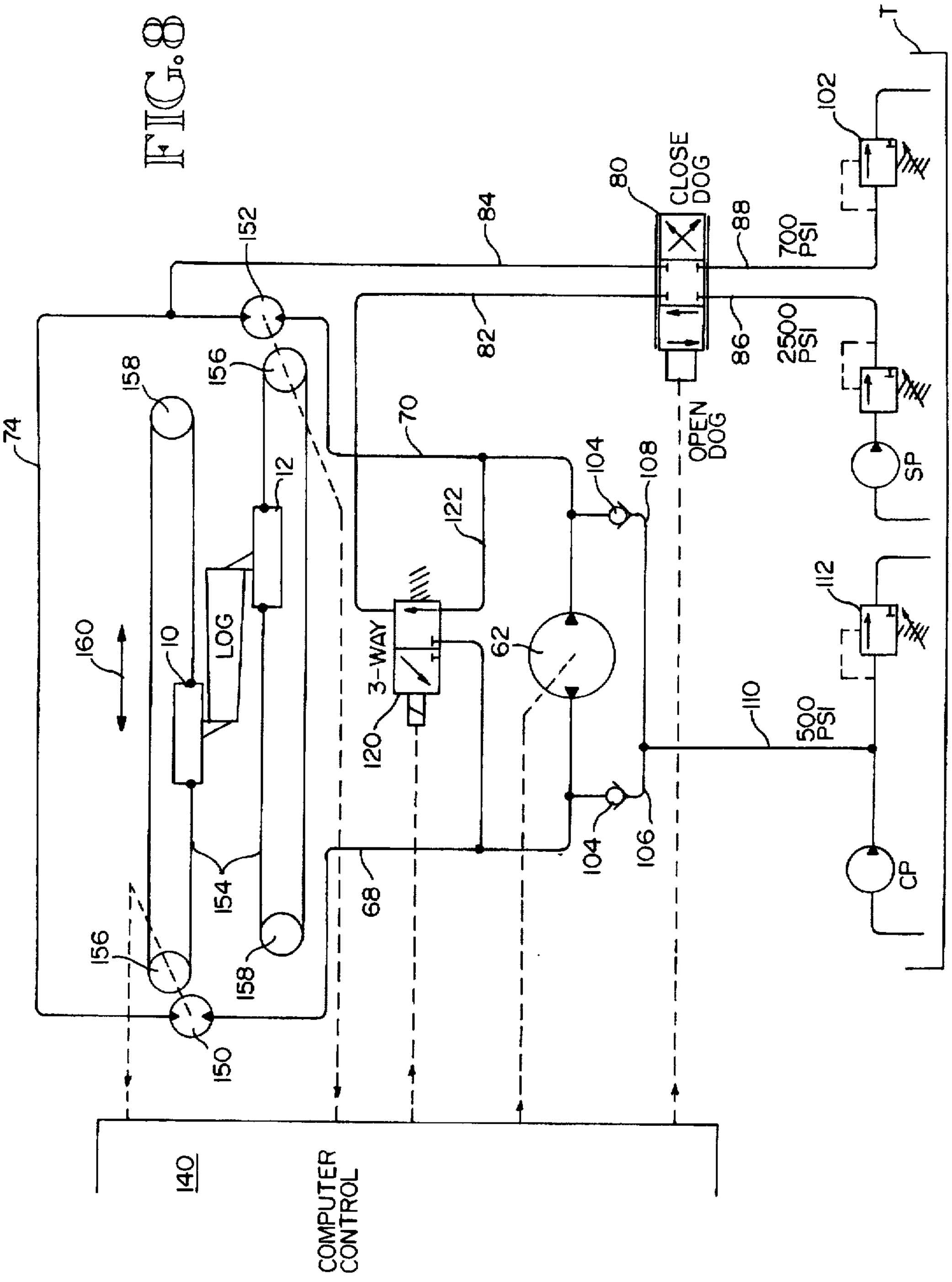
FIG. 8 is a schematic view of another embodiment of the log carriage system, such embodiment being characterized by the carriage sections being moved back and forth by endless cables that are powered by rotary hydraulic motors, with the system otherwise being essentially the same as they system shown by FIG. 6.

In FIG. 8, an alternate carriage system is shown wherein the linear hydraulic motors are replaced with rotary hydraulic motors and cable drives. Each linear hydraulic motor is replaced with a Calzone MR2400P rotary hydraulic motor 150, 152. A grooved drive drum is directly attached to the shaft of each Calzone motor. Two cables are attached to, and wound on, each drive drum. One cable is attached directly to a carriage. The other cable passes to the far end, goes around a free-wheeling sheave, and is then attached to the opposite end of that carriage. The two carriages have identical independent drives. The cable and sheave drive for carriage 12 is shown below the log and below carriage 10. However, this is done for schematic purposes only. Preferably, carriages 10 and 12 ride along the same track, as shown in FIGS. 1–3.

To close the dogs, pressure from system pump SP moves through line 86, through switching valve 80 in its second "closed" dog position, into line 84, into loop 74 and to rotary hydraulic motors 150, 152. Motor 152 rotates drive sheave 156 to move carriage section 12 along the linear path of the conveyor track. Hydraulic fluid returns to tank T from motor 152 through lines 70, 122, and 82 and line 88.

To open the dogs, switching valve 80 is moved to its first position, establishing pressure in line 82. Valve 120 is de-energized, therefore this pressure enters line 122 and line 70 to motor 152. The pressure difference between lines 82 and 84 then causes reversible motor 152 to rotate drive sheave 156 in the direction to move carriage 12 away from carriage 10. Carriage 10 does not move because flow through motor 150 is blocked by pump 62.

For feeding the log through the saws, hydraulic pump 62 operates in the same manner as discussed with reference to FIG. 6. In fact, the rest of the system operates in the same manner as discussed with reference to FIG. 6.

Since the volumetric efficiency of rotary motors is substantially lower than the volumetric efficiency of linear motors, i.e., rotary motors leak more, it may be necessary to hold switching valve 80 in its clamp position while a log is dogged up. With linear hydraulic motors, i.e., with cylinders, this probably is not necessary since the hydraulic oil that creates dog pressure is trapped and cannot escape. With rotary motors, it is preferable to hold 1.1 volts on the servo-valve coil of switching valve 80 while the log is dogged. When operated this way, dog pressure is steady and there is little tendency to drop a log.

Prior art carriages carry their log-clamping equipment, including motors and a chain-driven winch, or other cable-gripping mechanism on the carriage itself. A main advantage of the disclosed log carriage system is that log clamping equipment has been removed from the carriage. This allows the carriages to be extremely lightweight. A lightweight carriage can be moved more quickly by any given hydraulic system, which leads to higher productivity for the machine. In addition, the present two carriage sections are exact mirror images of each other, which facilitates efficient manufacture of the components.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A log carriage system, comprising:

first and second log carriage sections mounted for travel back-and-forth along a linear path, and spaced to receive and clamp a log between them;

a first reversible hydraulic motor connected to the first carriage section and having first and second ports;

a second reversible hydraulic motor connected to the second carriage section and having third and fourth ports;

a reversible hydraulic pump having fifth and sixth ports;

a first conduit interconnecting the second and fifth ports;

a second conduit interconnecting the third and sixth ports;

said first and second conduits and said pump together defining a first loop between the motors; and a third conduit connecting the first and fourth ports and forming a second loop between the motors, wherein the pump is operable in a first direction, to pump hydraulic fluid from the first motor to the second motor, to power the motors for moving the carriage sections together in a first direction, along the linear path, and the pump is operable in a second reverse direction, to pump hydraulic fluid from the second motor to the first motor, to power the motors for moving the carriage sections together in a second opposite direction along the linear path.

2. A log carriage system according to claim 1, comprising a fluid pressure line, a return line, and a four-way switching valve, said switching valve being connected to the fluid pressure and return lines and to the first and second loops, for switching hydraulic fluid pressure and return between the first and second loops, for moving the carriage sections together and apart.

3. A log carriage system according to claim 1, wherein the first and second reversible hydraulic motors comprise linear hydraulic motors, each having a cylinder component and a piston component, with each log carriage section connected to a piston component.

4. A log carriage system according to claim 1, wherein the first and second reversible hydraulic motors comprise rotary hydraulic motors, and further comprising a cable and sheave drive mechanism for moving the first and second log carriage sections along the linear path in response to rotation of the first and second hydraulic motors.

5. A log carriage system according to claim 2, and further comprising a fourth conduit connecting the four-way switching valve to the first conduit, a three-way, two-position switching valve in said fourth conduit, two position switching said valve positions being a closed position and an open position and said two position switching valve being in said open position for connecting the first conduit to the return line when the hydraulic pump pumps hydraulic fluid from the first motor to the second motor.

6. A log carriage system according to claim 1, and further comprising a charge pump for recharging hydraulic fluid into the first loop, and a check valve between the first loop and the charge pump to prevent the flow of hydraulic fluid from the first loop to the charge pump.

7. A log carriage system according to claim 2, and further comprising a back pressure relief valve between the four-way switching valve and return line to maintain a minimum pressure level in the first and second loops.

8. A log carriage system according to claim 5, and further comprising a microprocessor controller connected to the three-way, two-position valve, the four-way switching valve and the hydraulic pump, to control operation of the three-way, two-position switching valve, the four-way switching valve, and the hydraulic pump.

9. A log carriage system according to claim 5, and further comprising a fifth conduit connecting the four-way switching valve to the second conduit, and a three-way, two-position switching valve in said fifth conduit, said valve having an open position and a closed position, and said valve being in its closed position for disconnecting the second conduit from the fifth conduit when the four-way valve is positioned to connect the fifth conduit to return.

10. A log carriage system according to claim 3, wherein each first and second linear hydraulic motor includes a piston component having a piston rod that extends outwardly of one end of the cylinder component.

11. An end dogging control system for moving a pair of end dogs toward and away from each other to clamp and release a log, and for moving the end dogs in unison together back and forth through a cutting station; the control system including:

a first actuator having a first and second fluid chamber separated by a piston reciprocally positioned within the first actuator, the piston mounted to a piston rod that is secured to one of the end dogs;

a second actuator having a first and second fluid chamber separated by a piston reciprocally positioned within the second actuator, the piston mounted to a piston rod that is secured to the other end dog;

a first pressure line providing fluid communication between the first fluid chambers of the first and second actuators;

a second pressure line providing fluid communication between the second fluid chambers of the first and second actuators;

a first pump in the second pressure line for moving fluid between the second fluid chambers in order to move the end dogs in unison in a common direction;

a second pump for providing pressure to the first and second pressure lines;

a switching valve for switching the first and second pressure lines between pressure and return.

12. An end dogging control system according to claim 11, and further comprising a three-way, two-position valve for connecting the second working chamber of the first actuator to tank and for disconnecting the high pressure side of the first pump from return.

* * * * *

UNITED STATES PATENT AND TRADEMARK OFFICE

CERTIFICATE OF CORRECTION

PATENT NO. : 5,692,876

DATED : December 2, 1997

INVENTOR(S) : Robert E. Cameron et al.

It is certified that error appears in the above-identified patent and that said Letters Patent is hereby corrected as shown below:

Claim 5, column 8, lines 2-4, "two position switching said valve positions being a closed position and an open position" should be -- "said two position switching valve positions being a closed position and an open position,"

Signed and Sealed this

Seventeenth Day of March, 1998

Attest:

BRUCE LEHMAN

*Attesting Officer* *Commissioner of Patents and Trademarks*